UNITED STATES PATENT OFFICE.

AUGUSTUS MORAND, OF PHILADELPHIA, PENNSYLVANIA.

ART OF CLARIFYING EXTRACTS.

SPECIFICATION forming part of Letters Patent No. 338,431, dated March 23, 1886.

Application filed May 2, 1885. Renewed February 20, 1886. Serial No. 192,744. (No specimens.)

*To all whom it may concern:*

Be it known that I, AUGUSTUS MORAND, a citizen of the United States, residing in the city of Philadelphia and State of Pennsylvania, have invented certain new and useful Improvements in the Art of Clarifying Tannin Extract and other Similar Liquids, of which the following is a specification.

This invention is designed most particularly to effect an improvement in the method of clarifying or refining tannin extract; but it is applicable as well to other analogous liquids, particularly those of an astringent and slightly acidulous or alkaline character, which it is desired to render neutral, or nearly so.

Heretofore the clarification of tannin extract has been effected through the agency of either gelatine or blood. The former method consists in stirring a solution of gelatine into the crude extract, whereupon it is precipitated by union with the tannin, forming tannate of gelatine. This method is wasteful, because of consuming the tannin, and effects but an imperfect clarification of the extract. The latter method consists in cooling the extract (if too hot) to below the coagulating-point of albumen, stirring in the blood, and raising the temperature until the blood coagulates, whereupon it gradually precipitates and the clear liquor is drawn off or decanted, being subsequently filtered to more completely free it from the precipitate. This method is objectionable because of the skill necessary in the manipulation, the costliness of blood, and the practical impossibility of procuring the blood and using it while fresh, it being always more or less rancid, surrounding the factory with repulsive odors, nauseating the workman in the clarifying-room, and tainting the extract.

My invention avoids the use of fresh or liquid blood or other clarifying substance in its natural condition, and employs instead caseine or other equivalent clarifying substance in a state of solution, its solvent being a substance having a greater affinity for some constituent of the extract than it has for the caseine or its equivalent. This clarifying solution is stirred into the tannin extract, its solvent combining with some constituent of the extract, or some substance added to the extract before or after the addition of the clarifying solution, and the clarifying substance being consequently liberated, resolving itself into flocculent particles, which grasp and absorb the impurities in the extract. This is the distinguishing or generic feature of my invention, the particular or specific features of which, as well as its practical application, will be described hereinafter.

I will now proceed to describe in detail the preferred method of applying my invention in the manufacture of refined commercial tannin extract suited for use by tanners and dyers. The tannin is extracted from wood, bark, or other vegetable substance by any of the well-known processes, preferably by leaching or digesting the vegetable matter in acidulated water. For this purpose, when comminuted wood is used, I have found a proportion of about eight and one-half (8½) pounds of sulphuric acid to six thousand (6,000) pounds of wood to give the best results. The best proportion will, however, vary with the character of the wood or other vegetable matter, and with the quality of the water. If the latter contains lime, enough more of the acid should be added to neutralize the lime. On the completion of the extracting process the crude extract is drawn off into a tank, and if hot it should be permitted to cool to below 65° centigrade. The acid may, instead of being added to the water before the extraction, be added to the crude extract after it is thus drawn off; but the former method is preferable. At this stage of the process it has heretofore been customary, whenever acid was used in the extraction, to add an alkali to the crude extract sufficient to neutralize this acid, the operation of clarification being subsequently performed. According to my preferred method this manipulation is avoided and the crude extract is clarified as soon as it is drawn off.

Before describing the operation of clarifying I will first describe the method of preparing the clarifying agent, as follows: I take skimmed milk and precipitate its caseine by any of the well-known means, preferably by hot water. The cream should have been thoroughly removed, in order that no oily matter may be present in the curds or precipitated caseine. The curds should then be well washed to free them from every trace of the "whey," which retains the lactose and soluble salts.

The caseine should be prepared thus with care, in order to secure it as pure as possible. Then to each ounce of the pure caseine I add a weak solution consisting of about fourteen grains of carbonate of soda dissolved in water. Other alkalies may, however, be used; but when sulphuric acid is used in extracting the tannin I prefer carbonate of soda to other alkalies. In this alkaline solution the curds are quickly dissolved, forming thus an alkaline solution of caseine, of such consistence as to be capable of freely and readily mingling with the crude tannin extract. This solution constitutes the clarifying agent. The acidulous extract being preferably at a temperature of between 10° and 65° centigrade is then clarified by stirring into it a suitable quantity of this alkaline solution of caseine. The proper proportion varies with the acidity of the solution and the density of the extract, but with the solution described, and having the extract at about 15° barkometer, a proportion of about one ounce of the solution to each gallon of the decoction produces good results. A better formula would be to add enough of the alkaline solution to neutralize, or nearly so, the sulphuric acid remaining in the extract. The alkaline solution should be gently but thoroughly stirred into the extract, so as to be disseminated completely and uniformly therethrough; but the extract should not be violently agitated. As soon as the sulphuric acid combines with the alkali the caseine is liberated, not in curds or in clots, as in coagulating with milk or blood, but in the finest state of woolly flocculence, seizing and removing from the liquid the coloring-matter and other impurities which it holds in suspension. Too great agitation or too high a degree of heat would disturb this light flocculent condition of the caseine and impair its clarifying action, the best result being always attained when the caseine solution is so thoroughly and yet gently commingled with the extract as to cause it to pervade every drop of the liquid, neutralizing all the free sulphuric acid, and being resolved into the minutely-fine woolly condition described; it only remains to separate the clarified liquid from the caseous particles. This separation will effect itself spontaneously by the precipitation of the caseine, if the extract be not too dense, and the clear extract may then be decanted or drawn off at the top, leaving the precipitate on the bottom of the tank. The extract is found to be beautifully clear and of a much lighter color, being in these respects superior to that produced from similar crude extract by any of the methods of clarification heretofore used, and without loss of tannin or the introduction into the extract of any objectionable substance.

To insure the ready precipitation of the caseous matter and impurities, the extract should be of considerably less weight than the casein. A density exceeding about 20° barkometer renders the precipitation undesirably slow, and in such case the separation of the caseine had best be effected by filtration. The extract should be passed through some suitable filtering medium, which will arrest the caseine and let the clear liquid through. The clarified extract is then ready to be concentrated to any desired degree, usually about 150° barkometer (25° Baumé.) This should be done *in vacuo*, in order to heat the tannin as little as possible. The caseous precipitate, with the impure matters which it has removed from the extract, should be dried or partially dried and used as a fertilizer.

Having thus described the preferred application of my invention, I will now proceed to mention some modifications of which it is susceptible. Instead of mixing the caseine solution with the extract while the latter is still acidulous, as described, the ordinary method may be followed of adding alkali to neutralize the sulphuric acid, thereby rendering the extract turbid, and neutral, or even slightly alkaline. The caseine solution is then added and stirred through, the extract remaining still turbid, without becoming flocculent. Dilute acid must then be stirred in sufficient to neutralize the alkali and free the caseine from solution. The caseine immediately becomes flocculent and acts to clarify the liquid, as before. This method is inferior to that first described in that it is more complicated and troublesome, and less certain, and leaves in the extract an unnecessary amount of foreign acid or salt, which is undesirable.

It is not essential to my invention that the caseine solution should be alkaline. The caseine may be dissolved in acid instead, hydrochloric acid being preferable, and be used for clarifying a liquid or extract that is somewhat alkaline in its character; or it may be mixed with an acidulous liquid and sufficient alkali be afterward added to neutralize the acid and permit the caseine to precipitate.

Other clarifying substances, equivalents for caseine, may be substituted therefor for some purposes. For instance, the coagulated albumen of blood may be dissolved in alkali and used to similar effect. The blood should be taken in the abattoir while fresh, and heated, or stirred into hot water, in order to thoroughly coagulate it. The coagulum should then be thoroughly washed to remove soluble impurities, and then dried for transportation. When ready to be used, it should be dissolved in alkali, as described for the caseine, and the solution will be stirred into the extract in the same manner as the caseine solution. The precipitation will occur in a state of division finer than when blood is coagulated in the extract by heat, and its effect in clearing the extract will be much more thorough and satisfactory. It is nevertheless believed to be inferior to the caseine solution.

My improved process effects the clarification of the tannin extract more rapidly and satisfactorily than the blood process heretofore practiced; it leaves the extract of a lighter color and more thoroughly freed from foreign matter; it in no degree taints the extract; it is not in the least repulsive to the senses of the workman, and its performance requires less skill and judgment on the part of the workman, since he has only to stir in a predetermined quantity, and no manipulation of the temperature is required.

As compared with the process heretofore practiced, wherein the acidulous extract is first rendered neutral by adding an alkali, and is subsequently clarified, my improved method has the advantage not only of simplifying the process by omitting one step or manipulation, but also of rendering the clarifying action more advantageous, and thereby improving the color. When the alkali is added, coloring-matter which has been held in union with the acid is set free by the superior affinity of the acid for the alkali, and so discolors the liquid, rendering it very turbid. By my method of adding the caseine simultaneously with the alkali, and combined therewith, the coloring-matter thus raised or liberated is instantly seized and held by the caseine before it can discolor the liquid.

I am aware that uncoagulated caseine (in the form of milk) has been used for clarifying acid liquors by being coagulated therein; also, that coagulated caseine has been dissolved both in acids and in alkalies; also, that an alkaline solution of caseine has been precipitated by the addition of an acid, and also that coagulated albumen has been dissolved in alkali; but I am not aware that caseine or albumen or other clarifying substance has been dissolved in a solvent, its solution added to a liquid containing suspended impurities, and then freed from its solvent while in such liquid, in order that it might precipitate and carry with it the impurities in the liquid. This I consider the essential generic feature of my invention.

I am also aware that various substances have been added to liquids to be purified, which, when so added, have united chemically with some component of the liquids or with some other substance afterward added, and the compound substance thus formed has acted to clarify the liquids. Those methods, however, are distinguished from my invention by the fact that according to my invention a compound substance is added to the liquid and is decomposed therein, one of its components being thereby liberated and acting to clarify the liquid, while its other component has entered into a new chemical combination.

In so far as this specification describes the mixing with the extract of a purifying or clarifying substance and the separation of the latter by filtration, this subject-matter is herein disclaimed, and is reserved to be claimed in my application No. 193,249, filed February 25, 1886.

What I claim, and desire to secure by Letters Patent, is as follows:

1. The improved method of clarifying vegetable extracts, which consists in dissolving caseine or its specified equivalent in a solvent which has a chemical affinity for a substance contained in or added to the extract, mingling the said solution with the extract, and separating the resulting precipitate from the clarified extract, substantially as specified.

2. The improvement in the art of manufacturing tannin extract, which consists in dissolving caseine or its specified equivalent in an alkaline solvent, mingling the solution with the acidulous extract in sufficient proportion to neutralize the free acid therein, and finally separating the resulting precipitate from the clarified extract, substantially as set forth.

In witness whereof I have hereunto signed my name in the presence of two subscribing witnesses.

AUGS. MORAND.

Witnesses:
CHARLES B. ENGLE,
SUSAN HASSEN.